US011479473B2

(12) United States Patent
Witter et al.

(10) Patent No.: US 11,479,473 B2
(45) Date of Patent: Oct. 25, 2022

(54) METHOD FOR MANUFACTURING A NANOPARTICLE MATERIAL AND A FLUORIDE ION BATTERY

(71) Applicant: Ambercon Technology (UK) Ltd, Truro (GB)

(72) Inventors: Raiker Witter, Saue Vald (EE); Irshad Mohammad, Uttarpradesh (IN); Palanivel Molaiyan, Tamilnadu (IN); Suresh Kumar, Delhi (IN)

(73) Assignee: AMBERCON TECHNOLOGY (UK) LIMITED, Truro (GB)

( * ) Notice: Subject to any disclaimer, the term of this patent is extended or adjusted under 35 U.S.C. 154(b) by 161 days.

(21) Appl. No.: 16/643,465

(22) PCT Filed: Aug. 31, 2018

(86) PCT No.: PCT/EE2018/000002
§ 371 (c)(1),
(2) Date: Feb. 28, 2020

(87) PCT Pub. No.: WO2019/042518
PCT Pub. Date: Mar. 7, 2019

(65) Prior Publication Data
US 2021/0070626 A1     Mar. 11, 2021

(30) Foreign Application Priority Data
Sep. 1, 2017   (EE) .................. P201700032

(51) Int. Cl.
*H01M 4/02* (2006.01)
*C01F 11/22* (2006.01)
(Continued)

(52) U.S. Cl.
CPC ............. *C01F 11/22* (2013.01); *H01M 4/582* (2013.01); *H01M 4/625* (2013.01);
(Continued)

(58) Field of Classification Search
CPC ..................................................... H01M 4/02
See application file for complete search history.

(56) References Cited

U.S. PATENT DOCUMENTS

2006/0019163 A1   1/2006   Amatucci et al.
2008/0102373 A1   5/2008   Potanin
(Continued)

OTHER PUBLICATIONS

International Search Report and Written Opinion received in PCT/EE2018/000002 dated Feb. 1, 2019; 16 pages.
Patro L N et al., "Mechanical Milling: An Alternative Approach for Enhancing the Conductivity of Snf" Materials Letters, Elsevier, Amsterdam NL, published Apr. 2012; pp. 26-28, vol. 80, XP028510106.
(Continued)

*Primary Examiner* — Jacob B Marks
(74) *Attorney, Agent, or Firm* — Hard IP LLC (57) ABSTRACT

A method is provided for manufacturing a nanoparticle material having an ionic conductivity as a battery material for Fluoride ion Batteries, thus, being capable for overcoming high resistances at the surfaces, grain-boundaries of nanoparticles or compartments of the nanoparticles by a material treatment selected from: (i) a ball-mill procedure under aerosol and/or vapour-pressure atmosphere, (ii) excess-synthesis, (iii) ball-milling with surface stabilizing and conductivity enhancing solid or/and gel/liquid additives or (iv) functionalizing the material to obtain functionalized nanoparticles (GSNP) comprising a dispersion of graphene, nanotubes and/or a further additive selected from carbon-black, graphite, Si and/or $CF_x$. Herein, fluorides ($Em_mF_n$), fluorides composites ($Em1_{m1}Em2_{m2} \ldots F_{h1}$) are synthesized, wherein a first metal, metalloid or non-metal Em or Em1 and a second metal, metalloid or non-metal Em2 are dissimilarly selected from various elements in a manner that a battery material having an increased ionic conductivity is obtained.

13 Claims, 13 Drawing Sheets

Process of surfaces stabilization due to vapor-pressure/ball-milling examining here humidity onto $CaF_2$.

(51) Int. Cl.
*H01M 4/58* (2010.01)
*H01M 4/62* (2006.01)
*H01M 10/0562* (2010.01)

(52) U.S. Cl.
CPC ..... *H01M 10/0562* (2013.01); *C01P 2002/86* (2013.01); *C01P 2004/03* (2013.01); *C01P 2004/04* (2013.01); *C01P 2004/64* (2013.01); *C01P 2004/80* (2013.01); *C01P 2006/40* (2013.01); *H01M 2300/0094* (2013.01)

(56) References Cited

U.S. PATENT DOCUMENTS

| | | | |
|---|---|---|---|
| 2013/0224594 | A1 | 8/2013 | Yushin et al. |
| 2014/0178750 | A1* | 6/2014 | Anji Reddy ............ H01M 4/06 429/188 |

OTHER PUBLICATIONS

Benjamin Ruprecht et al., "Anion Diffusivity in Highly Conductive Nanocrystalline BaF2:CaF2 Composites Prepared by High-Energy Ball Milling," Journal of Materials Chemistry, published Jan. 2008, pp. 5412-5416, vol. 18, No. 44, XP055523543.

Carine Rongeat et al., "Nanostructured Fluorite-Type Fluorides As Electrolytes for Fluoride Ion Batteries," Journal of Physical Chemistry C, publised Mar. 2013, pp. 4943-4950, vol. 117, No. 10, XP055523053.

M. Anji Reddy et al., "Batteries Based on Fluoride Shuttle," Journal of Materials Chemistry, published Jan. 2011, pp. 17059-17062, vol. 21, No. 43, XP055228216.

A. Duvel et al., "Mechanosynthesis of the Fast Fluoride Ion Conductor BA 1- x La x F 2+ x: From the Fluorite to the Tysonite Structure," Journal of Physical Chemistry C, published Apr. 2014, pp. 7117-7129, vol. 118, No. 13, XP055523445.

* cited by examiner

Figure 1. Process of surfaces stabilization due to vapor-pressure/ball-milling examining here humidity onto CaF₂.

Figure 2. SEM-picture and sketch of a humidised CaF$_2$/ball-milled surface stabilized nano-particle.

Figure 3. IS-measurement to prove low ionic resistance: ~$10^{-5}$ S/cm of humidised $CaF_2$ nanomaterial (24 h humidity under KCl and 18 h ball-milling) at room temperature and $^{19}F$-NMR spectrum indicating the surface contributions. No HF could be found.

Figure 4. TEM-picture of the ("excess"-synthesized) CaF$_2$ nano-particle and sketch.

Figure 5. ¹H-NMR spectrum of "excess"-synthesized $CaF_2$ nano-particle showing $H_3O^+$ as counter-ion for $F^-$ instead of $OH^-$ (surface stabilizing DEG and solvent is also present).

Figure 6. IS-measurement to proof low ionic resistance (high conductivity) of "excess"-synthesized $CaF_2$ nano-particle: ~$10^{-5}$ S/cm at 40 °C, 60 °C and $^{19}F$ spectrum indicating the increased surface contributions. No HF visible.

Figure 7. Electrode III. Synthesis of MeF$_{n+x}$-GSNPs.

Figure 8. Representation of an electrochemical cell.

Figure 9. Photograph of a battery pellet indicating the different components.

Figure 10. With known electrodes (Mg/CoF$_2$) but improved solid electrolyte material a solid state FIB performs at room temperature is shown (cycling, cell capacity, coulomb efficiency).

Figure 11. Invention of the Battery-Device IVa. The battery device consists of functionalized nano-materials mainly avoiding compositions like intercalation materials or mixtures reducing graphite and binder. The surface of the electrode nano-particles are electric conductive itself.

Figure 12. Invention of the Battery-Device IVb. The battery device consists of functionalized nano-materials mainly avoiding compositions like intercalation materials or mixtures reducing graphite and binder. The surface of the electrode nano-particles are electric conductive itself.

Figure 13. Illustration of IS-measurement of $PbF_2/SnF_2$ composites proof low ionic resistance (high conductivity) of $10^{-3}$ S/cm at 25°C and $^{19}$F-NMR spectrum indicating the different phases and surface contributions.

METHOD FOR MANUFACTURING A NANOPARTICLE MATERIAL AND A FLUORIDE ION BATTERY

CROSS-REFERENCE TO RELATED APPLICATIONS

This application is a U.S. national stage filing under 35 U.S.C. 371 of international patent application no. PCT/EE2018/000002, filed on Aug. 31, 2018, which claims priority to Estonian patent application no. P201700032, filed on Sep. 1, 2017, the contents of both of which are incorporated herein by reference in their entirety.

FIELD OF THE INVENTION

The present invention is related with the field of batteries, especially with batteries which are considered as alternatives to the known lithium based batteries. More particular, the present invention relates to a method for manufacturing a nanoparticle material having an ionic conductivity as a battery material for a fluoride ion battery and a fluoride ion battery comprising the nanoparticle material.

BACKGROUND OF THE INVENTION

Fluoride Ion Batteries (FIBs) are a promising and interesting alternative for electrochemical energy storage. Recently, results have been reported on a reversible charge and discharge of the FIBs using a solid electrolyte, a metal fluoride as cathode materials and metal as the anode. Due to their high theoretical energy density values, Fluoride Ion Batteries constitute interesting alternatives to Li-ion batteries and others batteries, such as Zn—O, Li—S. Na—S, or Li—O batteries. FIBs can be made safer, even bio-compatible.

However, a particularly critical component in the FIBs is the electrolyte which, preferably, should exhibit a very high ionic conductivity. Using liquid electrolytes, on one hand, may set reactive HF acid (hydrofluoric acid) or even fluor gas free, thus, making the battery unstable. On the other hand, current solid electrolytes require elevated temperatures and, by using rare-earth elements, are rather cost intensive. In addition, since electrode materials may suffer from low ionic conductivity, electrolyte has to be added here, up to 40 vol. %. Generally, only a small layer of the electrodes instead of the corresponding bulk material may take part in the electrochemical reactions, thus, mainly restricting current technology to thin-layer electrodes.

US 2013/0224594 A1 discloses a battery cathode electrode composition comprising core-shell composites. Each of the composites may comprise a sulfur-based core and a multi-functional shell. The sulfur-based core is provided to electrochemically react with metal ions during battery operation to store the metal ions in the form of a corresponding metal-sulfide during discharging or charging of the battery and to release the metal ions from the corresponding metal-sulfide during charging or discharging of the battery. The multi-functional shell at least partially encases the sulfur-based core and is formed from a material that is (i) substantially permeable to the metal ions of the corresponding metal-sulfide and (ii) substantially impermeable to electrolyte solvent molecules and metal polysulfides.

US 2006/0019163 A1 discloses the formation and utilization of nanostructures of copper fluoride which include metal oxide composites, or nanocomposites; copper fluoride structures; and conducting matrices. The nanostructures serve as active electrode component materials for use in electrochemical cells, such as lithium battery cells, capable of exhibiting high specific capacity at high recharge and/or discharge rates. The invention provides a composition including a copper fluoride compound nanocomposite as an electrode material for an electrochemical energy storage cell. There is also described a composition having crystallites with sizes in the range of about 1 nm to about 100 nm, in which the crystallites include a copper fluoride compound incorporated in a nanocomposite. The nanocomposite may comprise nanoparticles (size of 1-100 nm), more macroscopic particle sizes (size >100 nm), or in the form of a densified thin (thickness <25 000 nm) film or thick film (thickness >25 000 nm).

US 2008/0102373 A1 discloses a safe secondary solid-state battery, possessing the high specific energy parameters along with a large quantity of the charge/discharge cycles. The technical result reached from the use of described battery are: the high specific energy parameters (up to 500 Wh/kg and up to 600 Wh/dm$^3$) along with excellent safety, the charge/discharge cycles is up to 1000 and more and high level of the stored energy along with the battery low self-discharge (1-3 percentages per year). It is proposed a solid-state battery consisting of a solid anode (AnO) based on a metal or alloy, whose fluorination leads to a fluoride or fluorides with a high isobar formation potential; a solid electrolyte in the form of a solid fluoride-ion conductor with low electron conductivity and a solid cathode (KtFO) based on a fluoride or a solid solution of the fluorides with a low isobar formation potential. In the charged state the battery anode is a metal (or its alloy) selected from the group consisting of Li, K, Na, Sr, Ba, Ca, Mg, Al, Ce, La or their alloys, or from the alloys of the listed metals. With the metals, selected from the group of Pb, Cu, Bi, Cd, Zn, Co, Ni, Cr, Sn, Sb, Fe; and in the discharged state the anode consists of the fluorides of the aforementioned metals, correspondingly.

US 2014/0178750 A1 discloses a lithium/graphite fluoride primary battery and a method for its manufacture. The process includes providing a graphite fluoride powder, mechanically milling the graphite fluoride powder to obtain an active material, providing a mixture comprising the active material and an electrically conductive carbon to form a part of positive electrode, providing a body comprising lithium as a part of negative electrode, and forming an electrochemical cell with the positive electrode and the negative electrode.

OBJECTIVE OF THE INVENTION

It is therefore an objective of the present invention to provide a method for manufacturing a nanoparticle material having an ionic conductivity as a battery material for Fluoride Ion Batteries and a solid state Fluoride Ion Battery in order to overcome the above-mentioned problems and shortcomings of the present state of the art, in particular, for being capable for overcoming high resistances at the surfaces, grain-boundaries of nanoparticles or compartments of the nanoparticles.

DISCLOSURE OF THE INVENTION

This problem is solved by a method for manufacturing a nanoparticle material having an ionic conductivity as a battery material for Fluoride Ion Batteries and a solid state Fluoride Ion Battery with the features of the independent claims. Preferred embodiments, which might be realized in an isolated fashion or in an arbitrary combination, are listed in the dependent claims.

The present invention is focused on the development of a new anode material which does not contain lithium (Li) as a charge carrier in the electrolyte but fluoride (F).

In a first aspect, the present invention relates to a method for manufacturing a nanoparticle material having an ionic conductivity as a battery material for a Fluoride Ion Battery. The method comprises the step of providing a fluoride compound, wherein the fluoride compound comprises fluorine and at least one metal, metalloid or non-metal.

Herein, the fluoride compound is subjected to an aerosol and/or vapour-pressure atmosphere and treated in a ball-mill procedure (inducing chemical reactions by mechanical forces due to fast rotation of a container filled with material powder and grinding balls); and/or the fluoride compound is synthesized by applying an excess-synthesis, wherein the excess synthesis comprises a chemical reaction using a stoichiometric overplus of a fluoride precursor and/or the fluoride compound is synthesized by applying at least one surface-stabilizing and conductivity-enhancing solid or/and gel/liquid additive. Hereby the battery material having an increased ionic conductivity is obtained.

Consequently, a solid state electrolyte material is disclosed which comprises high ionic conductivities, also denoted by the term "increased ionic conductivity". As a result, the solid state electrolyte material is suitable for a battery material which exhibits low resistances—much smaller than kΩ which is one limiting factor for battery internal resistances—applicable at and below room temperature. According to the method, the solid state electrolyte material is obtained by stabilizing solid nanomaterial surfaces, grain-boundaries and/or inter-phases, thus, avoiding a critical internal solidification, such as by a nanostructure stabilization. The battery materials as manufactured by applying the method are capable of improving solid state fluoride ion conductivities, thus, proving their applicability in room temperature performance of FIBs.

According to a first preferred embodiment of the method of the present invention, the solid state electrolyte material may be obtained by applying an aerosol and/or vapour-pressure atmosphere, wherein the material powder particles may be brought in diluted contact with the aid of a gaseous environment with evaporated or dispersed solvent molecules for surface physisorption—of a solvent, preferably a polar solvent, such as $H_2O$ with an additive, as for instance KCl, to adjust humidity and/or pH) and a surface stabilising molecular reordering by a ball-mill procedure—of a fluoride $Em_mF_h$ (Em for instance Ca) or a fluoride composite Em1, Em2, etc., according of the formula $Em1_{m1}Em2_{m2}\ldots F_{h1}$. As a result, nanoparticles are obtained having stabilizing surface layers providing improved ion mobility. As generally used, the term "nanoparticles" refers to single crystals, crystal clusters or polymorphous clusters with dimensions of 1 nm to 100 nm with respect to their size. A fluoride $Em_mF_{h+x}$, wherein x is equal or greater than 0, or a fluoride composite Em1, Em2, etc. may, preferably, be treated in an aerosol and/or vapour-pressure atmosphere and subjected to a ball-mill procedure in order to obtain the desired increased ionic conductivity of the battery material. After synthesis, the fluoride $Em_mF_{h+x}$ or the fluoride composite $Em1_{m1}Em2_{m2}\ldots F_{h1}$ may, preferably, be subjected to a solid surface-enhancing additive ball-mill treatment in order to further improve the ionic mobility for the desired conductivity increase of the nanoparticles. Compressing the powder to a dense material, in particular to bring the nanoparticles and the related nanosurfaces surrounding them into close contact, preferable due to induced mechanical pressure by a press, roller, barrel or centrifuge to form macroscopic material entities, the nanoscale conductivity may, preferably, be transferred to the macroscopic scale. As generally used, the term "macroscopic material" refer macroscopic particle sizes (size >100 nm), such as pellets.

Preferably, the metal fluoride may, firstly, be subjected to the aerosol and/or vapour-pressure atmosphere at normal pressure and a temperature of −10° C. to 300° C., preferably of 30° C. to 80° C., for a first period of time of 1 hours to 48 hours, preferably of 12 hours to 24 hours, and, subsequently, treated in the ball-mill procedure for a second period of time of 1 hours to 48 hours, preferably of 6 hours to 18 hours.

In a further preferred embodiment, the solid state electrolyte material which exhibits high ionic conductivity can be obtained at and below room temperature by applying an excess-synthesis, wherein the term "excess synthesis" refers to a chemical reaction in which a stoichiometric overplus of a fluoride precursor is applied, of $Me_mF_{h+x}$, wherein Me is Ca, Li, Ba, Al, Pb, Fe, Co, Ce, La, Sm, Eu, Cs, Gd, or Y, and wherein x exceeds 0, or composites, i.e. Me1, Me2, etc., e.g. $Me1_{m1}Me2_{m2}\ldots F_{(h1+x1)}$, and by stabilizing the surface during the process of reaction and after by ligands, in particular by polymers, fatty acids, ionic liquids or detergents. In particular, the excess synthesis may apply a surplus of a fluoride precursor, preferably $NH_4F$, $NH_4HF_2$, HF, DMIF·2.3HF (1,3-dimethyl-imidazolium fluoride), EMIF·2.3HF (1-ethyl-3-methylimida-zolium fluoride), TMAF (Tetramethylammonium fluoride) or TBAF (Tetrabutylammonium fluoride). For the metal precursors (Me1), preferably, a nitrate, an oxide, a hydroxide, or a chloride of the metal can be used. For the synthesis of the composites, a fluoride or a fluoroborate can, additionally, be used, in particular NaF, $NaBF_4$, KF, or $KBF_4$.

In a further referred embodiment, the high nanoparticle compartment single-crystal bulk conductivity of a fluoride $Em_mF_h$, or fluoride composite $Em1_{m1}Em2_{m2}\ldots F_{h1}$, where Em is selected from Cu, Pb, Fe, Sn, Zn, Bi, Cd, Co, Cr, Ni, Sb, C, Si, Ge, Ce, Se, Ca, Mg, Li, Na, K, Al, Sr, Ba, La, Sm, Eu, Cs, Gd or Y and Em1 and Em2 are dissimilar selected from Cu, Pb, Fe, Sn, Zn, Bi, Cd, Co, Cr, Ni, Sb, C, Si, B, P, N, Ge, Ce, Se, Ca, Mg, Li, Na, K, Al, Sr, Ba, La, Sm, Eu, Cs, Gd or Y comprising for instance hexafluorophosphates, tetrafluoroborates, amine fluorides, tetramine fluorides or sulfonium fluorides may, preferably, be released onto the macroscopic scale, hereby overcoming high resistances at surfaces, grain-boundaries of the nanoparticles compartments, in particular by applying solid-state synthesis, especially by applying a high energy ball-mill procedure, wherein stabilizing solid and gel and/or liquid additives which have reduced ability to interfere with the single-crystal structure may be used. Herein, in a preferred embodiment, the additives may comprise solvents and/or compounds denoted as "conductivity enhancing solid or/and gel and/or liquid additives" which may, preferably, be selected from at least one of carbonates, ethers, alcohols, aromatic compounds, sulfur compounds, phosphoric acid ester compounds, or ionic liquids, especially ethylene-carbonate, dimethyl carbonate, ethyl-methyl-carbonate, THF (tetrahydrofuran), NMP (N-Methyl-2-pyrrolidon), DMF (N,N-dimethylformamide), EG (ethylene-glycol) or DEG (diethylene-glycol); but also molten salts, such as DMIF·2.3HF (1,3-dimethyl-imidazolium fluoride), EMIF·2.3HF (1-ethyl-3-methylimida-zolium fluoride), TMAF (Tetramethylammonium fluoride) or TBAF (Tetrabutylammonium fluoride).

As a result of the previously mentioned embodiments, an overall macroscopic 3D-solid frame-work may, especially, be formed hereby which may stabilize and interact with the nanosurfaces, for instance with metal fluoride.

In a further preferred embodiment, nanomaterial, i.e. a powder of nanoparticles, may be brought into contact and mixed with a dispersion of graphene, nanotubes and/or a further additive selected from carbon-black, graphite, Si and/or $CF_x$, ball-milled, wherein remaining solvents can be evaporated, and may, preferably, be ball-milled again to obtain nanoparticles with highly conductive and active nanosurfaces which may be covered and interlinked with an additive and a graphene layer and/or a nanotube layer to obtain functionalized nanoparticles having a surface of a graphene layer or/and of a nanotube layer, which may be abbreviated to "GSNP".

The functionalized nanoparticles may serve as a further type of battery material which can have ionic and electric conductive entities in one unit and may, in addition, be capable of serving as a nanocontainer for anode and/or cathode materials. As used herein, the term "nanocontainer" refers to an arrangement of a material having nanoscale dimensions, i.e. dimensions <100 nm, which is adapted for providing anode and/or cathode materials. Consequently, the battery materials are synthesized as functionalized nanoparticles comprising a dispersion of graphene, nanotubes and/or other additives selected from carbon-black, graphite, Si and/or $CF_x$.

In a further aspect, the present invention relates to a battery having an anode comprising an anode material, a cathode comprising a cathode material and an electrolyte material providing a link between the anode material and the cathode material. In a particular embodiment, the battery can be as small as comprising three separate nanoparticles, i.e. a first functionalized nanoparticle (GSNP) being used as the anode material, a second functionalized nanoparticle (GSNP) being used as the cathode material, and a nanoparticle without the mentioned functionalization which is used as the electrolyte material. Alternatively, the electrolyte material comprises a battery material selected from nanotubes and/or additives selected from carbon-black, graphite, Si and/or $CF_x$. However, in a particularly preferred embodiment, the battery may comprise a large battery package having a plurality of the mentioned nanoparticles as the respective materials.

BRIEF DESCRIPTION OF THE DRAWINGS

The present invention is described below in more detail with references to the drawings, wherein.

DETAILED DESCRIPTION OF THE EMBODIMENTS

To facilitate cell preparation and material handling, cells were prepared in a discharged state with Cu, Pb, Fe, Sn, Zn, Bi, Cd, Co, Cr, Ni, Sb, C, Si, or composites or alloys thereof as cathode material and $CeF_3$, $CeF_4$, $CaF_2$, $MgF_2$, LiF, NaF, KF, $AlF_3$, $SrF_2$, $BaF_2$, $LaF_3$, $SmF_3$, or composites and/or solid-solutions thereof, such as $Na_3AlF_6$ or $Li_3AlF_6$, as the anode material and, in addition, cells were prepared in a charged state comprising $CuF_2$, $PbF_2$, $FeF_2$, $FeF_3$, $SnF_2$, $ZnF_2$, $BiF_3$, $CdF_2$, $CoF_x$, $CrF_x$, $NiF_2$, $SbF_3$, $CF_x$, $SiF_x$, or composite and/or solid-solutions thereof, such as $K_2NiF_4$, $Na_2SiF_6$ or $Na_3FeF_6$, as the cathode material and Ce, Ca, Mg, Li, Na, K, Al, Sr, Ba, La, Sm, or composites or alloys thereof as the anode material.

The possible charge and discharge mechanisms were examined by detailed ex situ X-ray diffraction (XRD), X-ray photoelectron spectroscopy (XPS) experiments, impedance spectroscopy (IS), battery testing equipment (e.g. battery cyclers and high precision power-meters) and Nuclear Magnetic Resonance Spectroscopy (NMR). Especially NMR is favoured analysing crystal but also non-crystalline contributions. Stabilized high mobile nanomaterial surfaces, grain-boundaries and/or inter-phases can be identified for instance with $^{19}$F-NMR. Related spectral peaks are mostly smaller than the bulk and having isotropic chemical shift resonance frequencies around −115 to −140 ppm. If strong additional effects as for instance considerable material susceptibilities or paramagnetic shifts, these contributions have to be additionally taken into account.

Excellent cycling performances were obtained for $MgF_2$, $PbF_2$, $SnF_2$, $BiF_2$, $CoF_2$ also prepared in the half-discharged state (e.g. $MgF_2$ mixed with Mg), together with high performance carbon materials and micro-grid electrode connectors, thus, forming a composite that could provide better interface contacts between the different reactive phases and surfaces within the electrodes. The results show that, apart from choosing carefully the electrode active materials, it is also advantageous to optimize the architecture of the electrodes.

Preferred Embodiments of the Electrolyte

Figure 1:
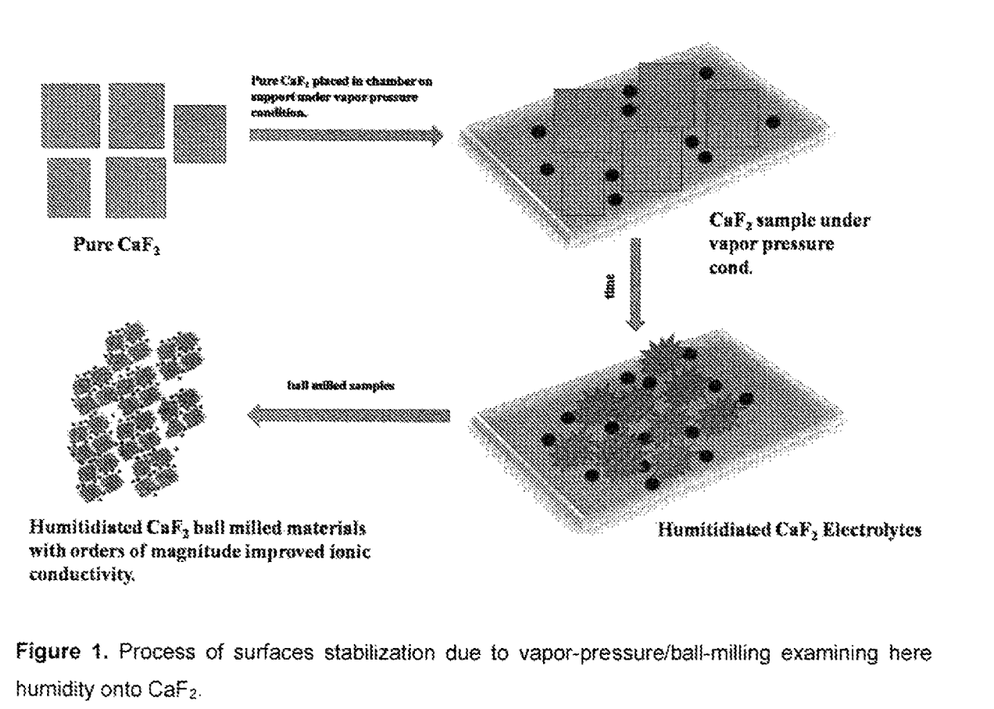
FIG. 1 illustrates a process of surface stabilization due to vapour-pressure and/or ball-milling by examining humidity onto $CaF_2$.
Figure 2:
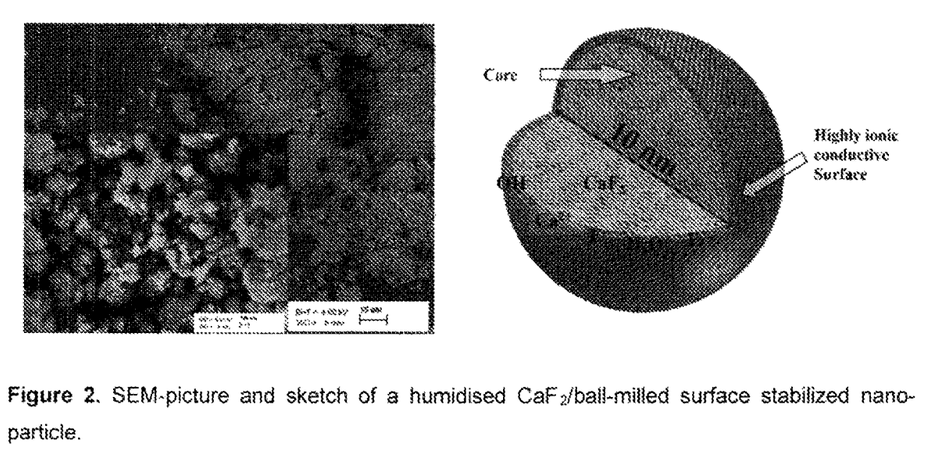
FIG. 2 illustrates an SEM image and an illustrating sketch of a humidified $CaF_2$ ball-milled surface stabilized nanoparticle.
Figure 3:
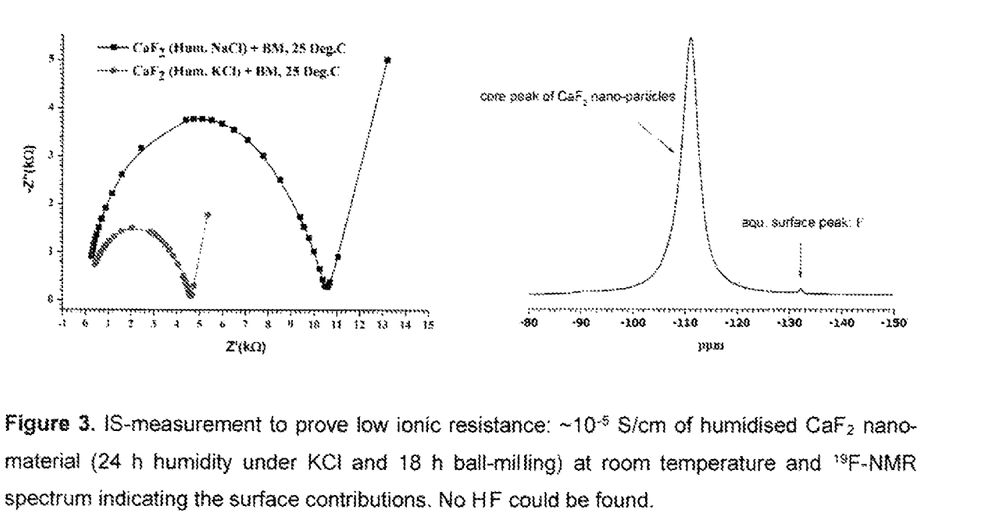
FIG. 3 illustrates an impedance spectroscopy measurement to prove low ionic resistance: $10^{-4}$ S/cm of humidified $CaF_2$ nanomaterial (24 h humidity under KCl and 18 h ball-milling) at room temperature and $^{19}$F-NMR spectrum indicating the surface contributions. No HF (hydrogen fluoride) could be found.

Example I, Humidified and Ball-Milled $CaF_2$ Nanoparticles, See FIGS. 1, 2 and 3

Pure $CaF_2$ powder is placed in a closed chamber, preferably, an enclosed desiccator comprising a solvent reservoir and a sample holder, on support under vapour pressure conditions (Pure water has, for instance, 3.2 kPa at 25° C.) between 49 and 51° C. for 24 hours in order to obtain humidified $CaF_2$ material. Thereafter, said mixture is ball-milled for 18 hours. This two stage procedure can be repeated several times. As a result, humidified $CaF_2$ ball-milled material with orders of magnitude improved ionic conductivity is obtained. The $CaF_2$ ball-milled surface stabilized nanoparticle is schematically illustrated in FIG. 2, wherein the nanoparticle comprises a core surrounded by a highly ionic conductive surface. FIG. 3 shows an impedance spectroscopy (IS) measurement proving low ionic resistance of $CaF_2$ nanomaterial at room temperature. No hydrogen fluoride can be found according to a correspondingly obtained NMR-spectrum.

Example II, Synthesis of $MeF_{(h+x)}$ Nanoparticles

Surface-mediated synthesis with excess of fluoride precursor ($NH_4F$) of nanoparticles having an assumed size of 10 nm and surface comprising stabilizing ligands:

Example IIa refers to a synthesis of $CaF_{(2+x)}$ nanoparticles using polyol ligand stabilization due to DEG (diethylene glycol), i.e.

Figure 4:
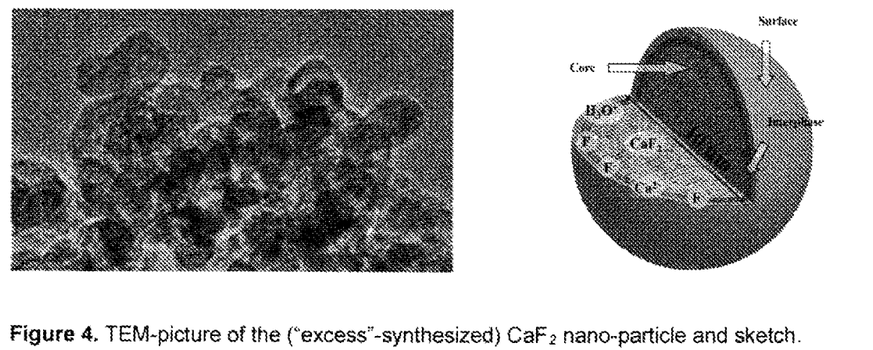
FIG. 4 illustrates a TEM image of the excess-synthesized $CaF_2$ nanoparticle and corresponding sketch of said $CaF_2$ nanoparticle.
Figure 5:
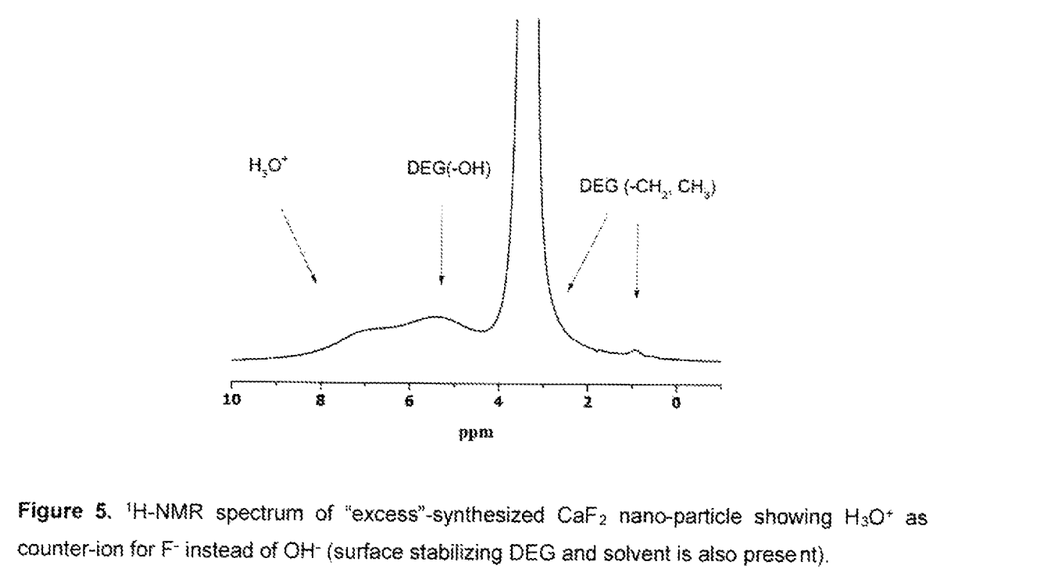
FIG. 5 illustrates a $^1$H-NMR spectrum of excess-synthesized $CaF_2$ nanoparticle showing $H_3O^+$ as counter-ion for $F^-$ instead of $OH^-$ (surface stabilizing DEG and solvent is also present)
Figure 6:
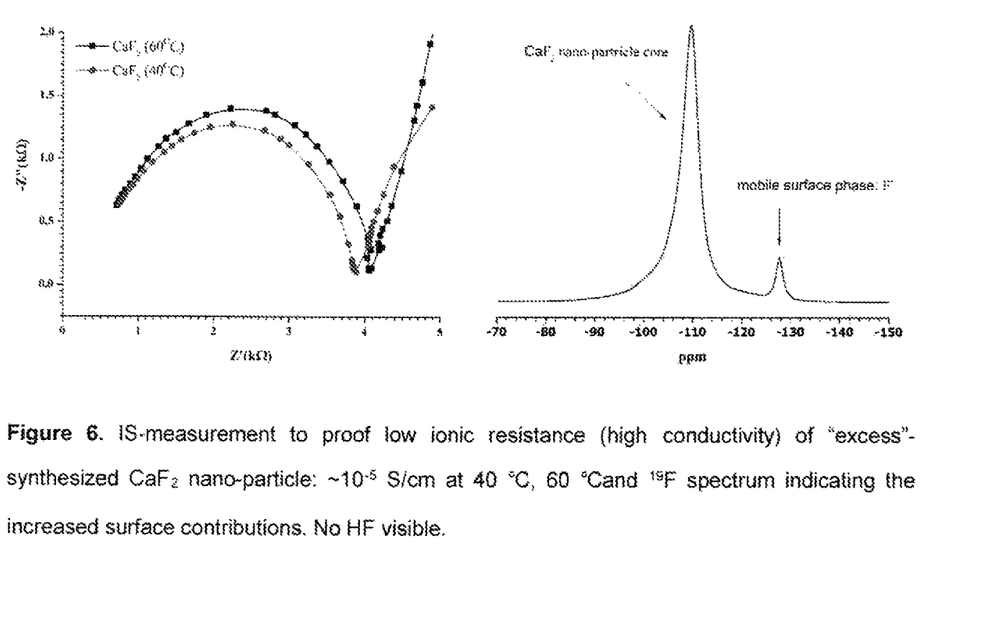
FIG. 6 illustrates an impedance spectroscopy measurement as a proof of low ionic resistance (i.e. high conductivity) of excess-synthesized $CaF_2$ nanoparticle: $10^5$ S/cm at 40° C., 60° C. and $^{19}$F spectrum indicating the increased surface contributions. No HF (hydrogen fluoride) visible.

In FIG. 4a TEM image and a schematic structure of the $CaF_2$ nanoparticle comprising a solid core surrounded by an interphase of calcium fluoride with mobile F surplus which is stabilized by a surface layer of $DEG/H_3O^+$ is shown. FIGS. 5 and 6 further show results of NMR and impedance spectroscopy measurements, respectively.

Example III, Synthesis of $MeF_{(h+x)}$-GSNPs

Figure 7:
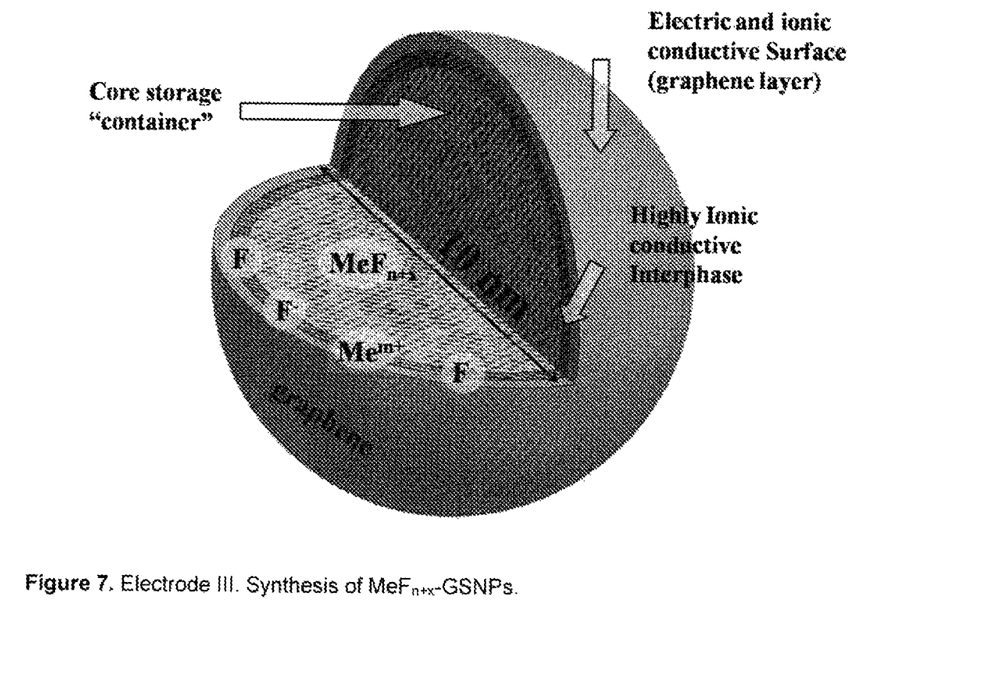
FIG. 7 illustrates an exemplary Electrode III with electric and ionic conductive surface (graphene layer as first layer), highly ionic conductive interphase (second layer) and core storage where the first layer and the second layer are forming a shell of the nanoparticle. Further FIG. 7 schematically illustrates the synthesis of $MeF_{n+x-}$-GSNPs.

Surface-mediated excess-synthesis of metallic nanoparticles comprising a special graphene surface in order to obtain nanoparticles which can also be denoted as "graphene surface nanoparticles", abbreviated to GSNPs:

The schematic structure of the GSNP is illustrated in FIG. 7.

Battery Devices

Figure 8:
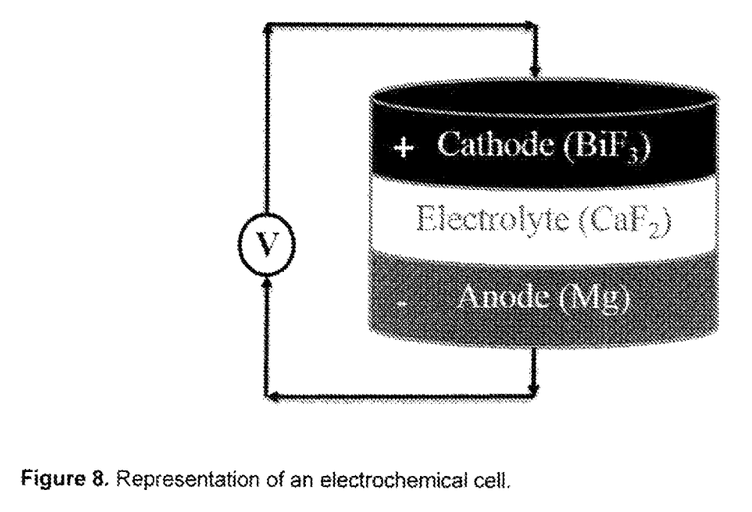
FIG. 8 illustrates an exemplary embodiment of an electrochemical cell according to present invention.

In FIG. 8 an embodiment of battery according to the present invention is prepared from materials as mentioned above.

Figure 9:
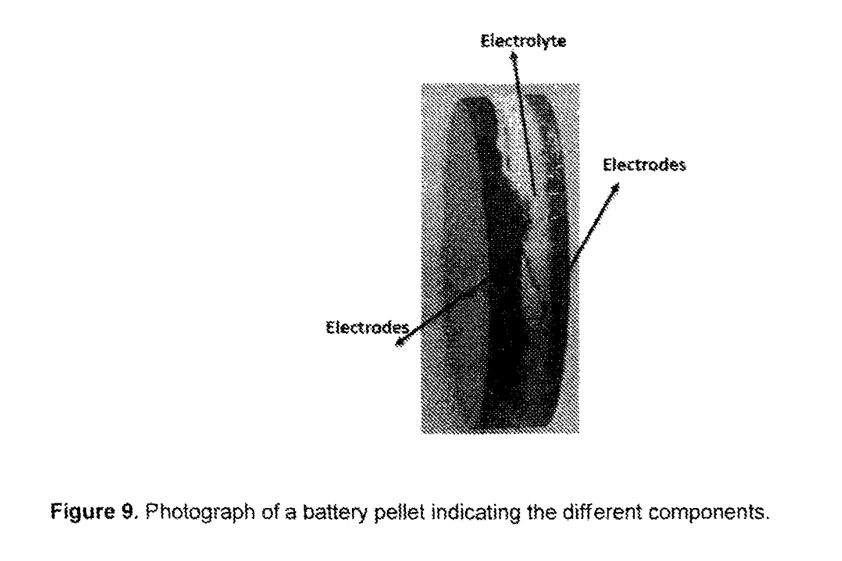
FIG. 9 illustrates a photograph of a battery pellet comprising the different components according to present invention.

FIG. 9 provides a photograph of this embodiment of the solid Fluoride Ion Battery (FIB) in shape of a pellet.

Figure 10:
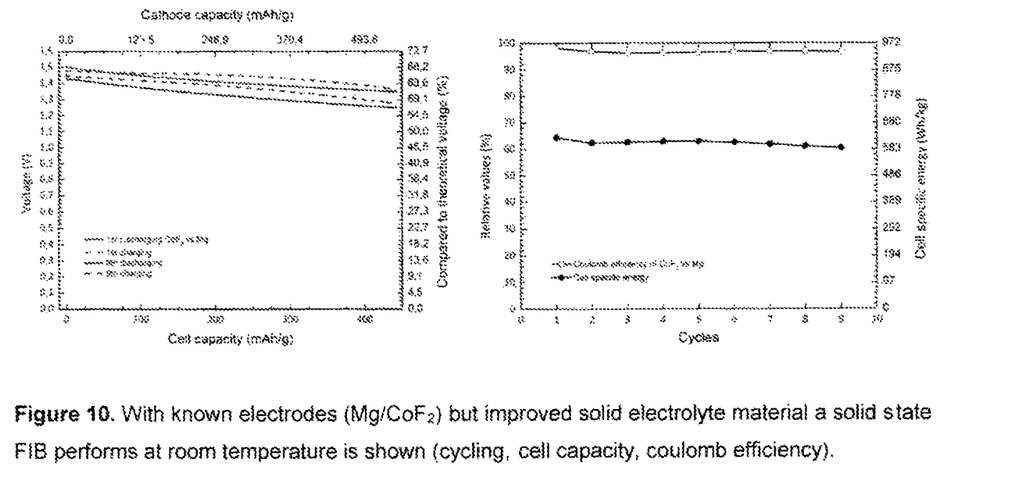
FIG. 10 illustrates diagrams with known electrode materials (Mg/$CoF_2$) but improved solid electrolyte material a solid state FIB performs and characteristics at room temperature.

In FIG. 10 a performance of the solid Fluoride Ion Battery comprising known electrodes but improved solid electrolyte material at room temperature is shown, in particular with respect to cycling, cell capacity and coulomb efficiency.

Figure 11:
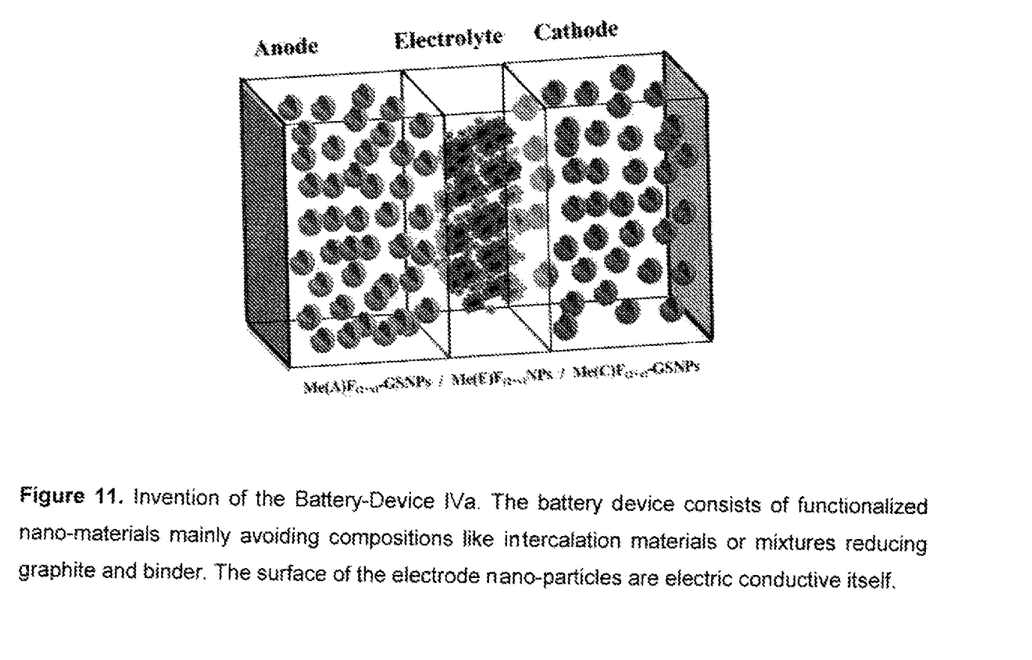
FIG. 11 illustrates an exemplary embodiment Iva of a battery device according to the present invention, wherein the battery device only comprises functionalized nanomaterials which are capable of mainly avoiding compositions such as intercalation materials or mixtures which may reduce graphite and binder, wherein the surface of the electrode nanoparticles are electrically conductive itself.

FIG. 11 shows an embodiment IVa of the battery device, wherein the battery device only comprises the functionalized nanomaterials as described above, thus, being capable of mainly avoiding compositions such as intercalation materials or mixtures comprising graphite and binder. The surface of the electrode nanoparticles is electrically conductive itself.

In this embodiment, each the anode material and the cathode material comprise the functionalized nanoparticles (GSNP) having a dispersion of graphene, wherein the electrolyte material is a material with increased ionic conductivity, in particular, comprising the metal fluoride nanoparticles as described above without functionalization.

Figure 12:
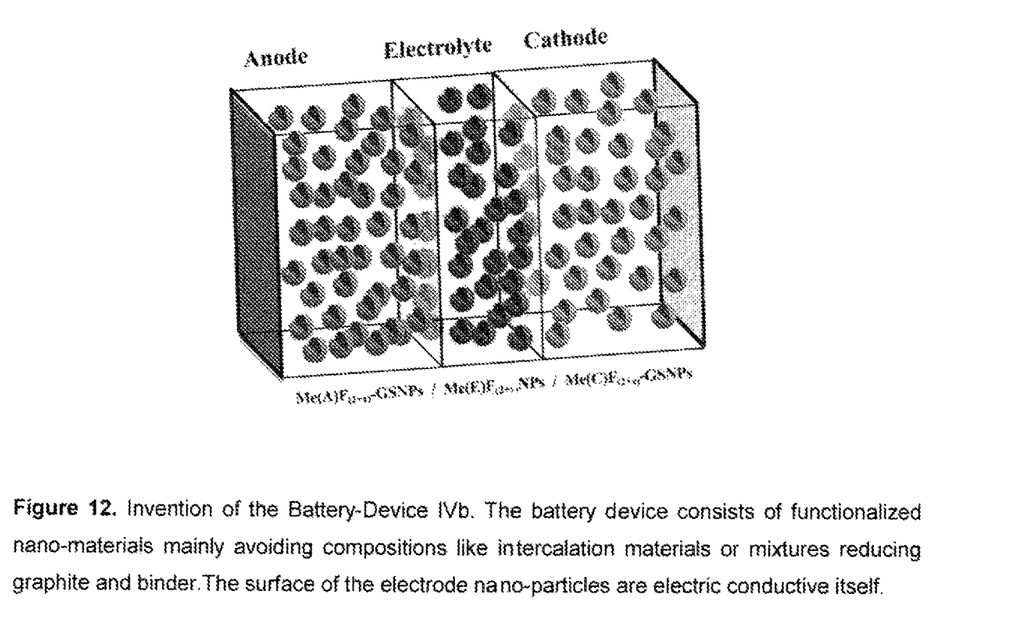
FIG. 12 illustrates an exemplary embodiment of a further embodiment IVb of the battery device according to present invention, wherein the battery device only comprises functionalized nanomaterials which are capable of mainly avoiding compositions such as intercalation materials or mixtures which may reduce graphite and binder, wherein the surface of the electrode nanoparticles are electrically conductive itself.

FIG. 12 illustrates a further exemplary embodiment IVb of the battery device according to present invention. Herein, the battery device only comprises the functionalized nanomaterials as described above. The anode material and cathode material of the battery device in this particular embodiment comprise the functionalized nanoparticles (GSNP) with a dispersion of graphene, wherein the electrolyte material comprises nanotubes and/or additives selected from carbon-black, graphite, Si and/or $CF_x$.

Applying these electrodes and the electrolyte materials according to the present invention, thus, allows providing FIBs having a higher applicability and safety. The corresponding battery devices con be considered as 3D-solid state devices intrinsically having 2D highly mobile nanosurfaces.

Figure 13:
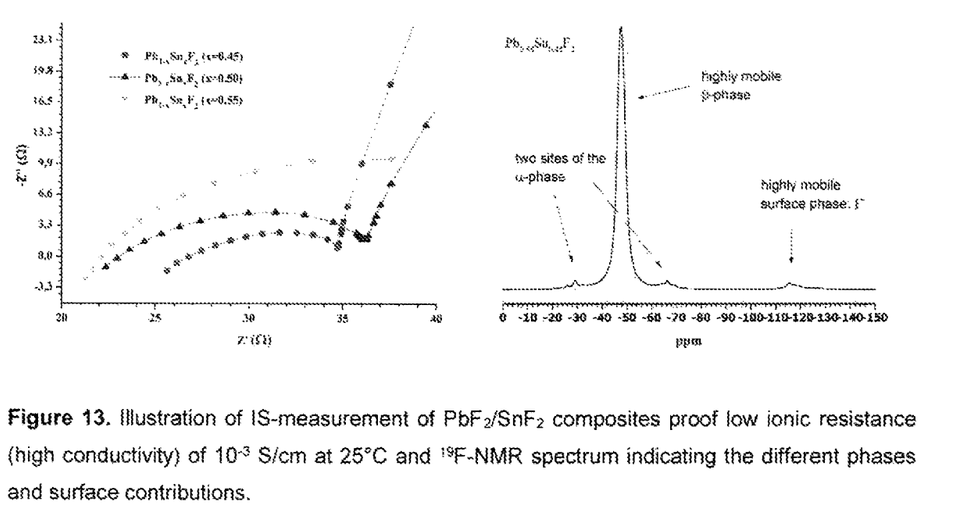
FIG. 13 illustrates an IS measurement of a $PbF_2/SnF_2$ composite as a proof of low ionic resistance (i.e. high conductivity) of $10^{-3}$ S/cm at 25° C. and $^{19}$F-NMR spectrum indicating the different phases and surface contributions herein.

In FIG. 13 impedance results and NMR-spectrum of $PbF_2/SnF_2$ composites are presented proving a conductivity of $10^{-3}$ S/cm at 25° C. originating from an interplay of different phases of the nanoparticles, such as nanocrystallites, and corresponding highly mobile F-surface contributions.

The invention claimed is:

1. A method for manufacturing a nanoparticle material having an ionic conductivity as a battery material for a Fluoride Ion Battery, the method comprising the step of providing a fluoride compound, the fluoride compound comprising fluorine and at least one metal, metalloid or non-metal, wherein the fluoride compound is subjected to an aerosol or vapour-pressure atmosphere and subsequently treated in a ball-mill procedure, whereby the battery material having an increased ionic conductivity is obtained.

2. The method of claim 1, wherein a fluoride compound of formula $Em_mF_{h+x}$, wherein indices m, h and x are related to the number of atoms in the chemical formula for the fluoride compound, m times element Em and (h+x) times fluorine F, wherein Em is a metal, metalloid or non-metal selected from Cu, Pb, Fe, Sn, Zn, Bi, Cd, Co, Cr, Ni, Sb, C, Si, Ge, Ce, Se, Ca, Mg, Li, Na, K, Al, Sr, Ba, La or Sm and wherein x is equal to or greater than 0, is treated by an aerosol or vapour-pressure atmosphere and subsequently by the ball-mill procedure.

3. The method of claim 2, wherein the metal fluoride is $CaF_2$ and source of vapour-pressure is $H_2O$ having an additive of KCl adapted for adjusting humidity and/or pH.

4. The method of claim 1, wherein a metal fluoride composite of formula $Em1_{m1}Em2_{m2} \ldots F_{h1+x1}$, wherein the indices m1, m2, ..., h1, and x1 are related to the number of atoms in the chemical formula for the fluoride compound, m1 times element Em1, m2 times element Em2, ... and (h+x) times fluorine F, which comprises at least two fluorides, wherein at least two elements Em1 and Em2 are dissimilarly selected from Cu, Pb, Fe, Sn, Zn, Bi, Cd, Co, Cr, Ni, Sb, C, Si, Ge, Ce, Se, Ca, Mg, Li, Na, K, Al, Sr, Ba, La or Sm and wherein x1 is equal or greater than 0, is treated by an aerosol or vapour-pressure atmosphere and subsequently by the ball-mill procedure.

5. The method of claim 1, wherein the metal fluoride is, firstly, subjected to the aerosol or vapour-pressure atmosphere at a temperature of −10° C. to 300° C. for a first period of time of 1 hours to 48 hours and, subsequently, treated in the ball-mill procedure for a second period of time of 1 hours to 48 hours.

6. The method of claim 1, wherein the metal fluoride of the formula $Em_mF_{h+x}$, wherein Em is a metal selected from Ca, Li, Ba, Al, Pb, Fe, Sn, Co, Ce, La, Sm, Eu, Cs, Gd or V and wherein x is equal or greater than 0, is synthesized by an excess synthesis with stoichiometric excess of a fluoride precursor selected from $NH_4F$, $NH_4HF_2$, HF, DMIF-2.3HF (1,3-dimethyl-imidazolium fluoride), EMIF-2.3HF (1-ethyl-3-methylimida-zolium fluoride), TMAF (Tetramethylammonium fluoride) or TBAF (Tetrabutylammonium fluoride).

7. The method of claim 1, wherein a metal fluoride composite of the formula $Em1Em2_{m2} \ldots F_{h1+x1}$ which comprises at least two metal fluorides, wherein at least two metals Em1 and Em2 are dissimilarly selected from Ca, Na, K, Li, Ba, Al, Pb, Fe, Sn, Co, Ce, La, Sm, Eu, Cs, Gd or Y and wherein x1 is equal or greater than 0, is synthesized by an excess synthesis with stoichiometric excess of a fluoride precursor selected from $NH_4F$, $NH_4HF_2$, HF, DMIF-2.3HF (1,3-dimethyl-Imidazolium fluoride), EMIF-2.3HF (1-ethyl-3-methylimida-zolium fluoride), TMAF (Tetramethylammonium fluoride) or TBAF (Tetrabutylammonium fluoride).

8. The method of claim 1, wherein a solid synthesis of a fluoride ($Em_mF_h$) is performed by using a ball-mill procedure in the presence of at least one surface stabilizing and conductivity enhancing solid, or liquid additive being adapted for a transfer of ionic conductivity of nanoparticles or of composites comprising the nanoparticles to a macroscopic material, wherein Em is a metal, metalloid or non-metal selected from Cu, Pb, Fe, S, Zn, Bi, Cd, Co, Cr, Ni, Sb, C, Si, Ge, Ce, Se, Ca, Mg, Li, Na, K, Al, Sr, Ba, La, Sm, Eu, Cs, Gd or Y.

9. The method of claim 1, wherein a solid synthesis of a fluoride composite ($Em1_{m1}Em2_{m2} \ldots F_{h1}$) is performed by using a ball-mill procedure in the presence of at least one surface stabilizing and conductivity enhancing solid, gel or liquid additive being adapted for a transfer of ionic conductivity of nanoparticles or of composites comprising the nanoparticles to a macroscopic material, wherein at least one metal, metalloid or non-metal Em1 and a second metal, metalloid or non-metal Em2 are dissimilarly selected from Cu, Pb, Fe, Sn, Zn, Bi, Cd, Co, Cr, Ni, Sb, C, Si, B, P, N, Ge, Ce, Se, Ca, Mg, Li, Na, K, Al, Sr, Ba, La, Sm, Eu, Cs, Gd or Y.

10. The method of claim 4, wherein the Em1 is selected from Ca, Ba or Pb and wherein Em2 is selected from Sn or Sm.

11. The method of claim 1, wherein the battery material having the increased ionic conductivity is further treated by a dispersion of graphene, nanotubes, further additive selected from carbon-black, graphite, Si, $CF_x$, or a mixture thereof, whereby a battery material comprising nanoparticles having a functionalized graphene- or/and nanotube-surface is obtained.

12. A solid state Fluoride Ion Battery (FIB) comprising an anode material, a cathode material, and an electrolyte material, wherein a nanoparticle material having an ionic conductivity as a battery material for a Fluoride Ion Battery is manufactured by (A) providing a fluoride compound, the fluoride compound comprising fluorine and at least one metal, metalloid or non-metal,
wherein the fluoride compound is subjected to an aerosol or a vapour-pressure atmosphere and subsequently treated in a ball-mill procedure;
wherein the anode material comprises a battery material manufactured according to (A), wherein the cathode material comprises a battery material manufactured according to (A), and
wherein the electrolyte material comprises a battery material manufactured according to (A) or
wherein the electrolyte material comprises a battery material selected from nanotubes or additives selected from carbon-black, graphite, Si, $CF_x$ or a mixture thereof.

13. The solid state Fluoride Ion Battery (FIB) of claim 12, wherein the battery material further comprises nanoparticles having a surface comprising functionalised graphene or nanotubes, said nanoparticles being obtained by further treating the battery material manufactured according to (A) with a dispersion of graphene, nanotubes, a further additive selected from carbon black, graphite, Si, $CF_x$, or a mixture thereof.

* * * * *